(12) United States Patent
Miller

(10) Patent No.: US 6,170,458 B1
(45) Date of Patent: Jan. 9, 2001

(54) INSULATOR SHIELD FOR SPARK PLUG

(75) Inventor: Kevin Lawrence Miller, Toledo, OH (US)

(73) Assignee: Cooper Automotive Products, Inc., Houston, TX (US)

( * ) Notice: Under 35 U.S.C. 154(b), the term of this patent shall be extended for 0 days.

(21) Appl. No.: 09/330,050

(22) Filed: Jun. 11, 1999

Related U.S. Application Data

(62) Division of application No. 09/065,905, filed on Apr. 24, 1998.

(51) Int. Cl.⁷ ....................................................... F02B 3/00
(52) U.S. Cl. ........................................... 123/298; 123/295
(58) Field of Search ..................................... 123/295, 298, 123/305

(56) References Cited

U.S. PATENT DOCUMENTS

| 2,878,299 | 3/1959 | Starr | 123/169 |
|---|---|---|---|
| 4,014,300 | * 3/1977 | Klomp | 123/295 |
| 4,232,638 | 11/1980 | Takahashi et al. | 123/260 |
| 5,650,687 | 7/1997 | van den Bogaert | 313/141 |

FOREIGN PATENT DOCUMENTS

| 196 27 524 A1 | 1/1998 | (DE) | H01T/13/41 |
|---|---|---|---|
| 0 831 213 A2 | 3/1998 | (EP) | F02B/23/10 |

\* cited by examiner

*Primary Examiner*—John Kwon
(74) *Attorney, Agent, or Firm*—Reising, Ethington, Barnes, Kisselle, Learman & McCulloch, P.C.

(57) ABSTRACT

A direct injection combustion engine includes a combustion chamber that includes a fuel intake port, an air intake port and a spark plug insertion opening. A spark plug includes a firing electrode, a ground electrode, and an insulator core nose. The spark plug is installed in the spark plug insertion opening so that the firing electrode, the ground electrode, and the insulator core nose extend into the chamber. A shield is positioned between the fuel intake port and the spark plug insertion opening and reduces the flow of fuel from the fuel intake port to the insulator core nose without preventing the flow of fuel to a spark gap formed between the firing electrode and the ground electrode.

14 Claims, 8 Drawing Sheets

INSULATOR SHIELD FOR SPARK PLUG

TECHNICAL FIELD

This application is a divisional (and claims the benefit of priority under 35 USC 120) of U.S. application Ser. No. 09/065,905, filed Apr. 24, 1998.

The invention relates to spark plugs.

BACKGROUND

In general, a spark plug includes an outer shell and an insulative core. At a firing end of the spark plug, a firing electrode extends from the insulative core and a ground electrode extends from the outer shell. The two electrodes define a spark gap between them. In a combustion engine, a spark formed in the gap is used to ignite a mixture of fuel and air.

In conventional two- and four-stroke combustion engines, a combustible fuel from a fuel injector or carburetor is mixed with air in the intake. When the intake valve or port opens, a fuel vapor, consisting of fuel and air, is pulled by negative pressure into the combustion chamber where it dissipates throughout the chamber. A spark at the spark plug ignites the fuel vapor, causing rapid expansion of the chamber contents and corresponding displacement of a piston.

A recent modification to the conventional combustion engine is the gasoline direct injection (GDI) engine. A defining characteristic of the GDI engine is the injection of fuel as a liquid. A second defining characteristic is the introduction of fuel and air into the combustion chamber through separate ports. Thus, rather than injecting a fuel vapor consisting of fuel and air, the combustible fuel is injected under pressure as a liquid through a fuel intake port and air is introduced through an air intake port, both of which open into the combustion chamber.

The fuel is sprayed as a liquid directly in the direction of the spark gap. The spray spreads out from the fuel intake port in the shape of a cone (i.e., a spray cone) with the central longitudinal axis of the spray cone aimed at the spark plug gap. A small percentage of the fuel vaporizes and mixes with the air injected into the chamber through the air intake port. By aiming the central longitudinal axis of the spray cone directly at the spark plug gap rather than attempting to fill the entire chamber with a combustible fuel vapor, less combustible fuel is needed to create a suitable displacement of the piston. A spark ignites the fuel during the brief period in which the fuel surrounds the spark plug gap, rather than at a later period in which the fuel would have dispersed to fill the entire chamber. Reduced fuel usage also results in a reduction in polluting emissions.

In GDI engines, the fuel is injected into the combustion chamber at different stages in the compression stroke depending upon speed. At low speeds the fuel is injected late in the stroke while at high speeds the fuel is injected early in the stroke. At low speeds, because of the high compression in the chamber resulting from the late stage of the compression stroke, the cone of fuel sprayed at the gap does not rapidly disperse throughout the chamber. Instead, the flow pattern of the spray cone is not substantially altered as it moves toward the gap. At high speeds, the fuel is injected when there is less compression and different flow patterns in the chamber. These differences cause the fuel to mix throughout the chamber.

In two-stroke GDI engines the fuel is injected during each cylinder compression stroke whereas in four-stroke GDI engines the fuel is injected during alternating cylinder compression strokes.

Although a direct injection (DI) engine may be operated using gasoline, as described above, other combustible fuels, such as alcohol, may be used. Moreover, while the combustible fuel may be injected in the combustion chamber in the form of a spray cone of fuel, it also may be injected as a stream of fuel or in other variations or shapes.

SUMMARY

In one general aspect, the invention features a DI combustion engine having a combustion chamber with a fuel intake port, an air intake port, a spark plug insertion opening and a spark plug inserted in the insertion opening. The spark plug includes a firing electrode, a ground electrode, and an insulator core nose that extends into the chamber when the spark plug is inserted in the opening. A shield is positioned between the fuel intake port and the opening and is configured to reduce the flow of fuel from the fuel intake port to the insulator core nose without preventing the flow of fuel to a spark plug gap defined between the firing electrode and the ground electrode.

Embodiments may include one or more of the following features. For example, the shield may be permanently, semi-permanently, or threadably attached to a surface of the chamber. The shield may be threadably inserted from outside the chamber, such as through a threaded channel passing through a wall of the chamber. The shield also may be attached to the spark plug and may be in the form of a thin rod or a skirt that partially or fully encircles the circumference of the insulator nose core. By reducing the flow of fuel from the fuel intake port to the spark plug insulator core nose, the shield protects the insulator from fouling, which is a build up of deposits that may impact plug life. The shield may be made of a metal, such as nickel or a nickel alloy, or ceramic material with thermal properties suitable for placement in the head of the combustion chamber. In the various embodiments, the shield extends from the surface a sufficient length to protect the insulator core nose but not an excessive length so as to block the fuel from reaching a spark gap between the firing electrode and the ground electrode.

An additional general aspect of the invention features the ground electrode configured to minimize the obstruction to fuel flow when the ground electrode is aligned between the fuel intake port and the firing electrode. The ground electrode may have a round shape or a shape resembling an air foil. Such a shape enhances the ability of a vapor portion of the injected fuel to flow around the ground electrode to reach the spark gap when the ground electrode is aligned in front of the injection port. The ground electrode has a rectangular firing surface to improve spark performance and the ability to attach a precious metal to the firing surface. A precious metal may be attached to the firing surface to lengthen gap life and improve spark plug performance.

Conventional spark plugs perform optimally in DI engines when the plug is aligned such that the ground electrode does not obstruct the path of fuel flow from the fuel injection port to the gap. The rounded or air-foil-shaped ground electrode provides an inexpensive and effective means of reducing the impact of plug alignment on engine performance. Moreover, the rounded or air-foil-shaped ground electrode is implemented with the protective shield to further improve spark plug performance.

The invention also provides a technique for improving engine performance. In one general aspect, a shield positioned between the injection port and the insulator core nose of a spark plug protects the insulator from fouling, which is a build up of deposits that may affect the spark gap and impact plug life. The shield may be attached to the cylinder head or may be a component of the spark plug.

Other features and advantages will be apparent from the following description, including the drawings, and from the claims.

DESCRIPTION

Figure 1A:
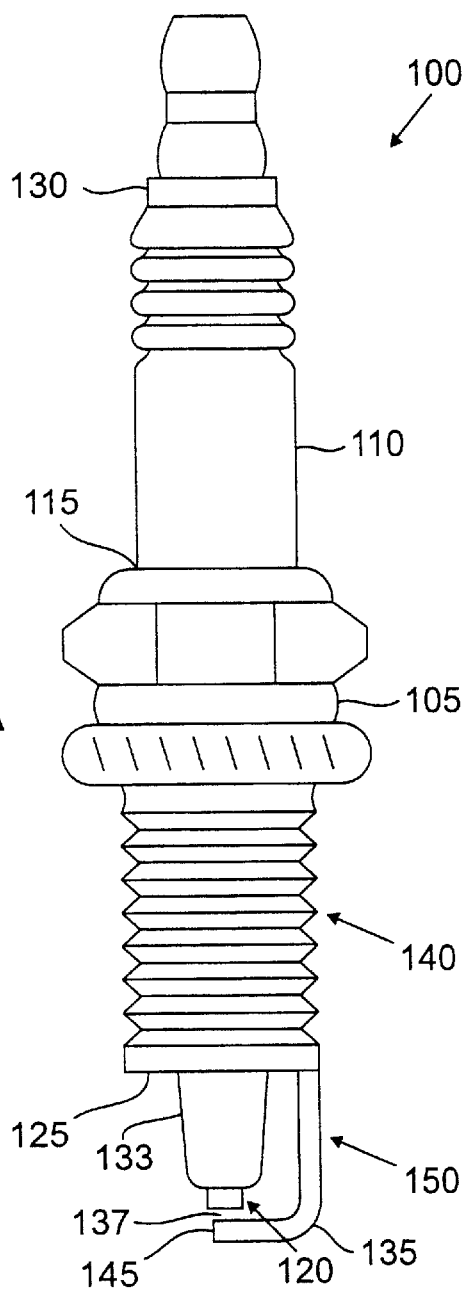
FIG. 1A is a side view of a spark plug having a rounded ground electrode.
Figure 1B:
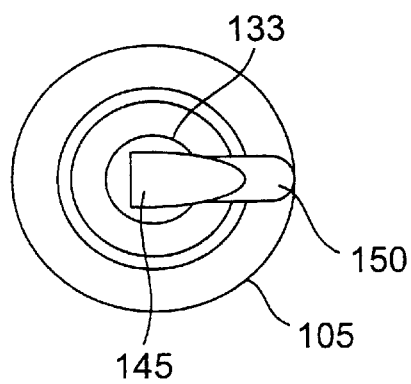
FIG. 1B is a bottom view of the spark plug of FIG. 1A.

Referring to FIGS. 1A, 1B and 2A–2C, a spark plug 100 includes an outer shell 105 and an insulator core 110. Insulator core 110 extends through a central bore 115 within outer shell 105. Insulator core 110 includes a firing electrode 120 at a firing end 125 and a terminal end 130 at the opposite end of spark plug 100. Firing electrode 120 extends out of an insulator core nose 133, which extends out of outer shell 105. Outer shell 105 includes a ground electrode 135 that extends from the outer shell 105 and terminates adjacent to firing electrode 120. A spark gap 137 is defined between firing electrode 120 and ground electrode 135. The ground electrode 135 is in the shape of an L-shaped pin. For example, ground electrode 135 may be formed from a metal rod 200 that is welded to outer shell 105 and then bent into an L-shape. Outer shell 105 also may include a threaded length 140.

Figure 2A:
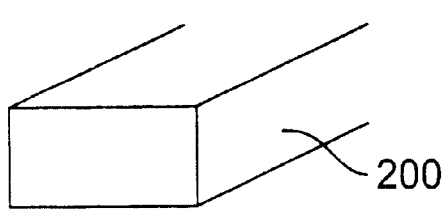
FIGS. 2A–2C are perspective views of, respectively rectangular, round, and air-foil-shaped rod.
Figure 2B:
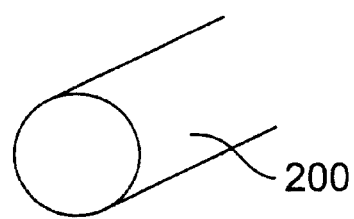
Figure 2C:
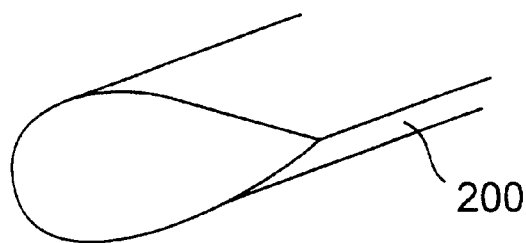
Figure 3:
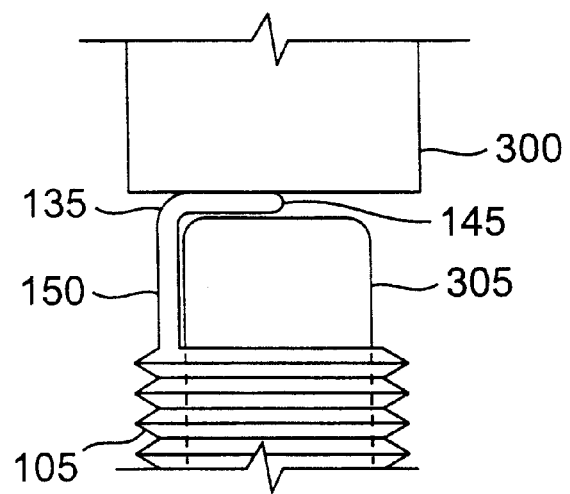
FIG. 3 is a side view of a press for use in shaping a firing surface of a ground electrode.

As illustrated in FIGS. 2A–2C, metal rod 200 may have a cross-sectional profile that is rectangular (FIG. 2A), round (FIG. 2B), or that resembles an air foil (FIG. 2C). Metal rod 200 may be made of nickel, for example. In general, a conducting end 145 of ground electrode 135 has a rectangular cross-section to increase spark quality. When ground electrode 135 is formed from a round or air foil-shaped metal rod, the portion of the rod at conducting end 145 may be flattened after it is welded to outer shell 105 and bent. For example, referring to FIG. 3, outer shell 105 may be placed in a press with conducting end 145 placed between an upper arbor 300 and a lower arbor 305. Conducting end 145 then may be flattened to dimensions of, for example, 0.045 inch thick and 0.105 inch wide. The rectangular cross-section and that surface ease the application of a precious metal pad to the conducting end 145. Such a precious metal pad may improve spark plug life. A remaining length 150 of ground electrode 135 is not flattened in the press and retains its original round- or air-foil-shaped profile. In spark plug 100, the longitudinal axis of length 150 is substantially parallel to the longitudinal axis of insulator core nose 133. However, length 150 may be implemented with the longitudinal axis of length 150 not substantially parallel.

Figure 4A:
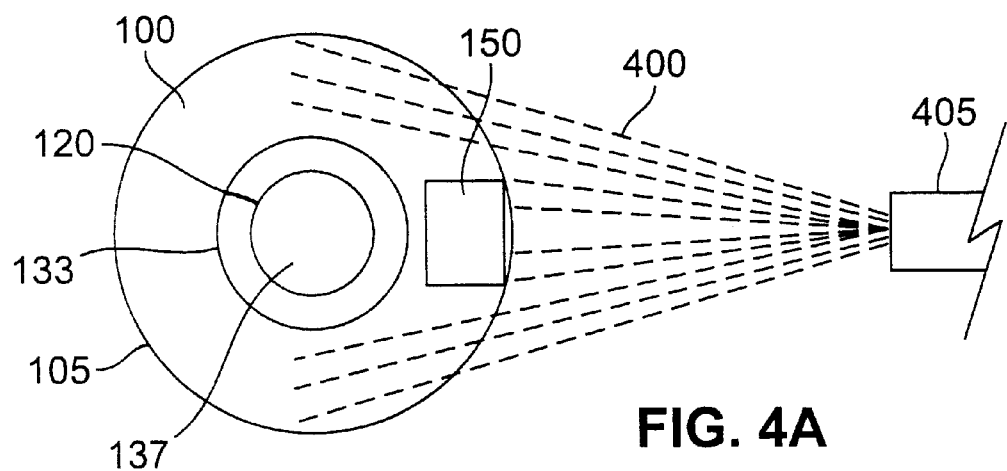
FIGS. 4A and 4B are cutaway bottom views of spark plugs having, respectively, rectangular and round ground electrodes, showing fuel flow from an injection port.

Referring to FIG. 4A, spark plug 100 is installed in a combustion chamber (not shown) of a DI combustion engine (not shown). Combustible fuel, in the form of a liquid spray cone 400, is injected from an injector 405 in the direction of spark gap 137. Length 150 of the ground electrode has a rectangular shape. The rectangular profile of length 150 blocks both the liquid and vapor in spray cone 400 from flowing directly to the spark gap 137.

Figure 4B:
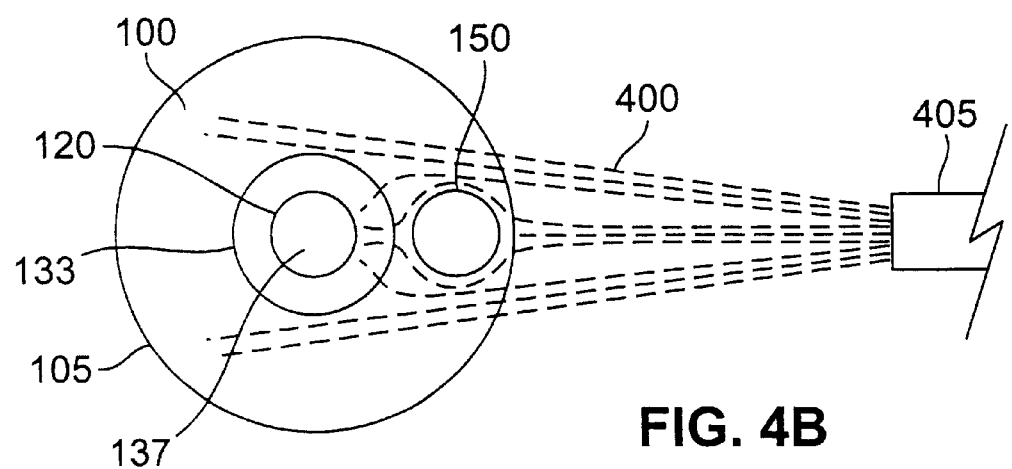

Referring to FIG. 4B, spark plug 100 is installed in a combustion chamber (not shown) of a DI combustion engine (not shown). Spray cone 400 from injector 405 is injected in the direction of the firing electrode 120. Length 150 of the ground electrode has a round shape. The round profile of length 150 obstructs the liquid, but not the vapor, in spray cone 400 from flowing directly to the area surrounding spark gap 137.

Figure 5A:
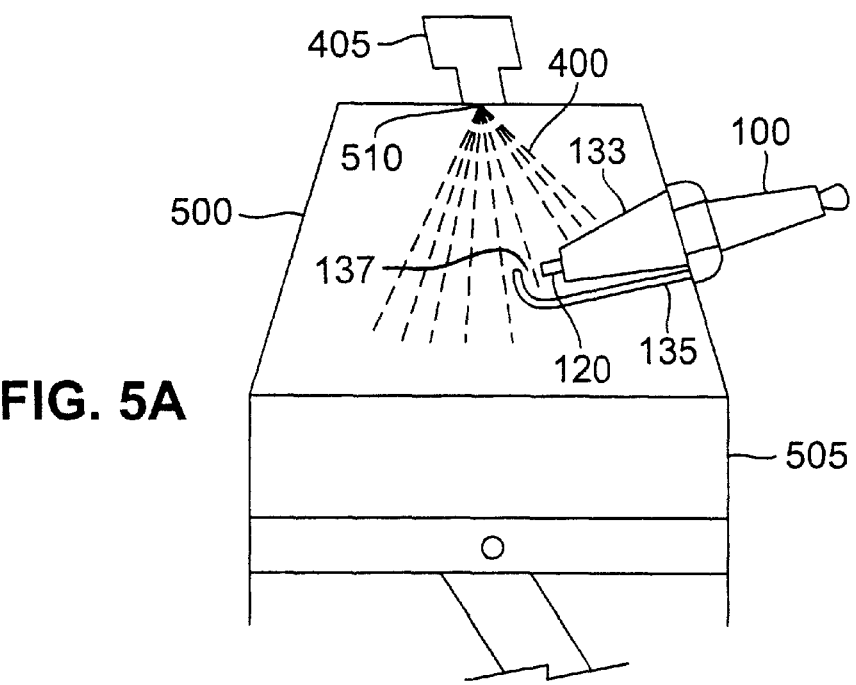
FIG. 5A is a side view of the spark plug of FIG. 1A installed in the head of a DI combustion engine.

Referring to FIG. 5A, spark plug 100 is threadably installed in a head 500 of a combustion chamber 505 of a DI combustion engine. A fuel intake port 510 opens into chamber 505. An injector 405 injects spray cone 400 of fuel in the direction of gap 137. A portion of the spray cone 400 contacts the insulator core nose 133.

Figure 5B:
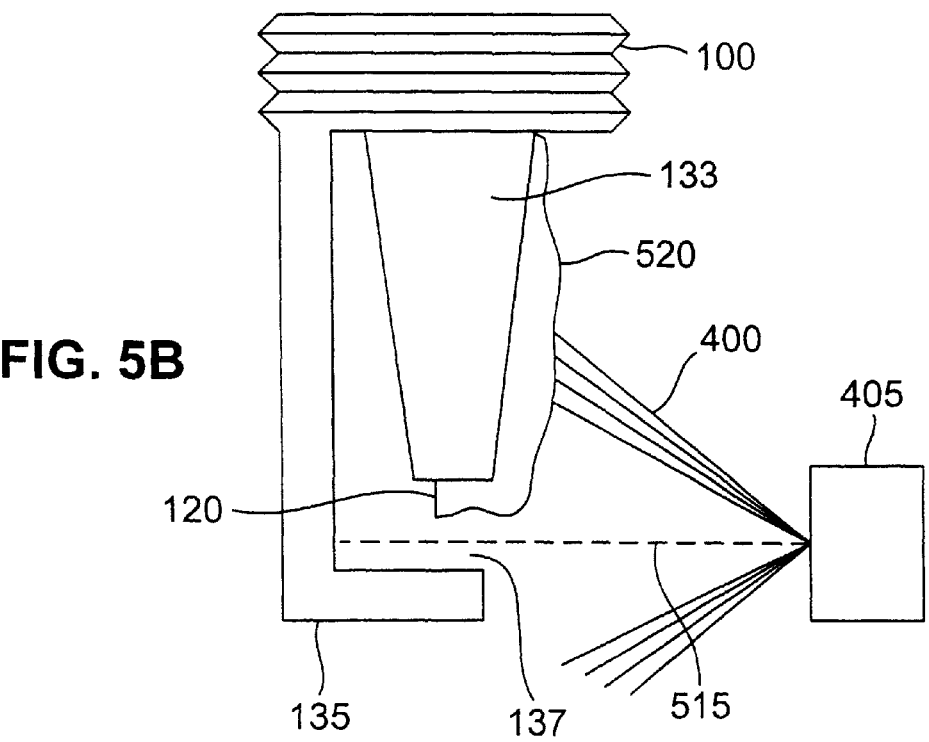
FIG. 5B is a side view of the spark plug of FIG. 1A installed in the head of a DI combustion engine showing deposits on the spark plug.

Referring to FIG. 5B, a spark plug 100 includes long insulator core nose 133, ground electrode 135, firing electrode 120 and spark gap 137. Injector 405 directs spray cone 400 in the direction of gap 137. A longitudinal axis 515 of spray cone 400 is directed at the gap 137 to improve engine performance. As spray cone 400 contacts long insulator core nose 133 over an extended period, a deposit 520 builds up on the surface of long insulator core nose 133, which may lead to fouling of the plug 100 and reduced performance.

Figure 5C:
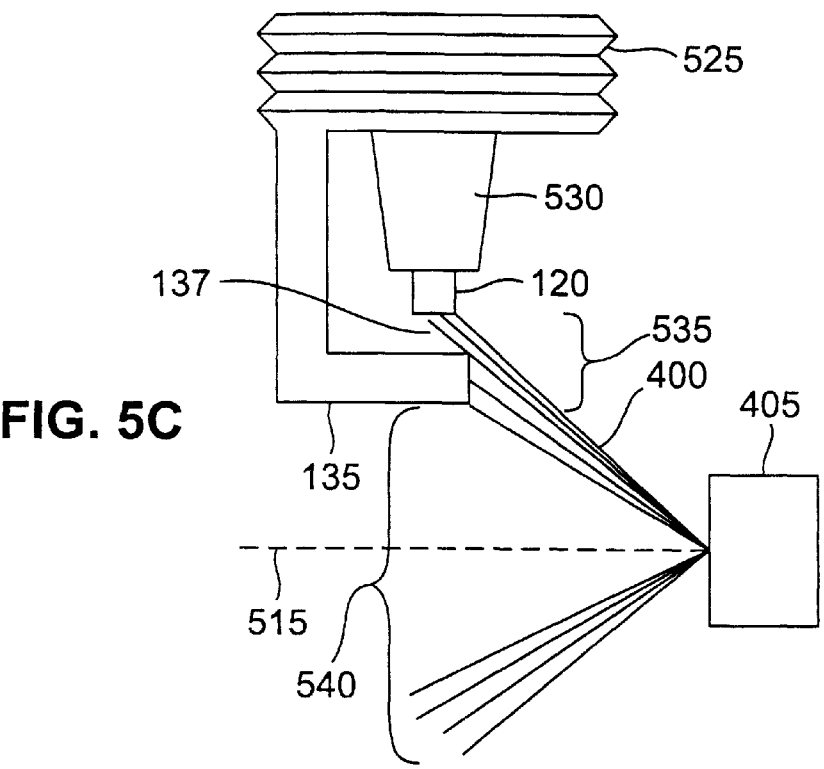
FIG. 5C is a side view of a spark plug with a short insulator core nose installed in the head of a DI engine.

Referring to FIG. 5C, a spark plug 525 includes a short insulator core nose 530, ground electrode 135, firing electrode 120 and spark gap 137. To prevent a build up of deposits on insulator core nose 530, an injector 405 sprays spray cone 400 such that only an edge portion 535 of spray cone 400 is not directed at spark gap 137. The remainder of spray cone 400 is not directed at spark gap 137 or spark plug 525. Although this configuration reduces the build up of deposits, engine performance is sacrificed because the majority of the fuel of spray cone 400 is not directed into the vicinity of the spark gap 137.

Figure 5D:
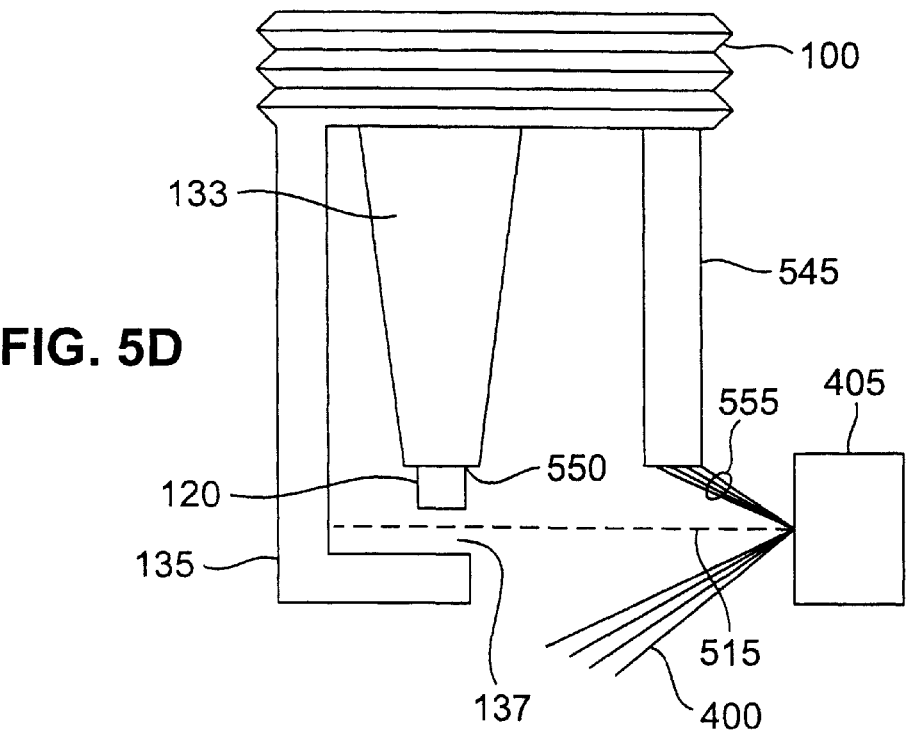
FIG. 5D is a side view of a spark plug and a protective shield installed in a DI engine.

Referring to FIG. 5D, spark plug 100 includes long insulator core nose 133, ground electrode 135, firing electrode 120 and spark gap 137. A shield 545 is adjacent to long insulator core nose 133 and terminates at a length substantially adjacent to a junction 550 of core nose 133 and firing electrode 120. The length may be varied to be longer or shorter to optimize shield performance. Shield 545 may be attached to the head of the engine or to the spark plug 100. Shield 545 also may be threadably inserted from the outside of the head through a threaded channel (not shown) or press fit into position.

Injector 405 injects spray cone 400 in the direction of gap 137. The longitudinal axis 515 of spray cone 400 should define the center of the spray cone and should pass from injector 405 to gap 137 to improve engine performance. A portion 555 of spray cone 400 is blocked by shield 545 from contacting long insulator core nose 133. As a result, there is a reduction in the deposits that may build up on the surface of long insulator core nose 133. As explained above, however, because the majority of spray cone 400 reaches spark gap 137, engine performance is not sacrificed in using the shield 545 to prevent the build up of deposits on the insulator core nose 133.

FIG. 5D also shows the optimal alignment of spark plug 100. When aligned as shown in FIG. 5D, ground electrode 135 does not obstruct the flow of spray cone 400 from fuel injector 405 to gap 137. However, this optimal alignment generally cannot be guaranteed without using expensive indexing procedures or other techniques.

Figure 5E:
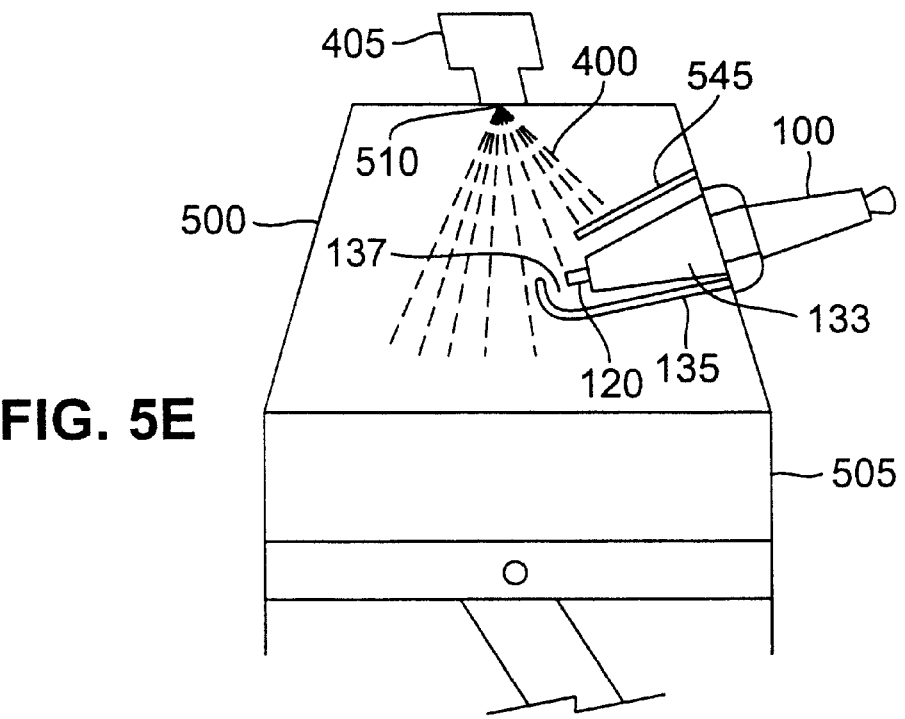
FIG. 5E is a side view of a spark plug and protective shield installed in the head of a DI engine showing optimal alignment of the spark plug.

Referring to FIG. 5E, spark plug 100 is threadably installed into head 500 of combustion chamber 505 of a DI combustion engine. Fuel intake port 510 opens into chamber 505. Injector 405 injects spray cone 400 in the direction of spark gap 137. Chamber 505 includes shield 545 mounted to head 500. The shield blocks the flow of spray cone 400 to the insulator core nose 133 and thereby reduces the amount of fuel that contacts the core nose 133 to eliminate or reduce the formation of deposits. Shield 545 is made of a metal or ceramic material with thermal properties suitable for placement in the combustion chamber. For example, shield 545 may be made of nickel or a nickel alloy. Shield 545 may be permanently or threadably attached to head 500. In addition, shield 545 may be threadably inserted into position from outside of the head through a threaded channel or may be press fit into position. FIG. 5E also illustrates optimal alignment of spark plug 100 with respect to the injection of spray cone 400 from fuel injector 405. The alignment is optimal when the firing electrode 120 is in a path between ground electrode 135 and injector 405.

Figure 5F:
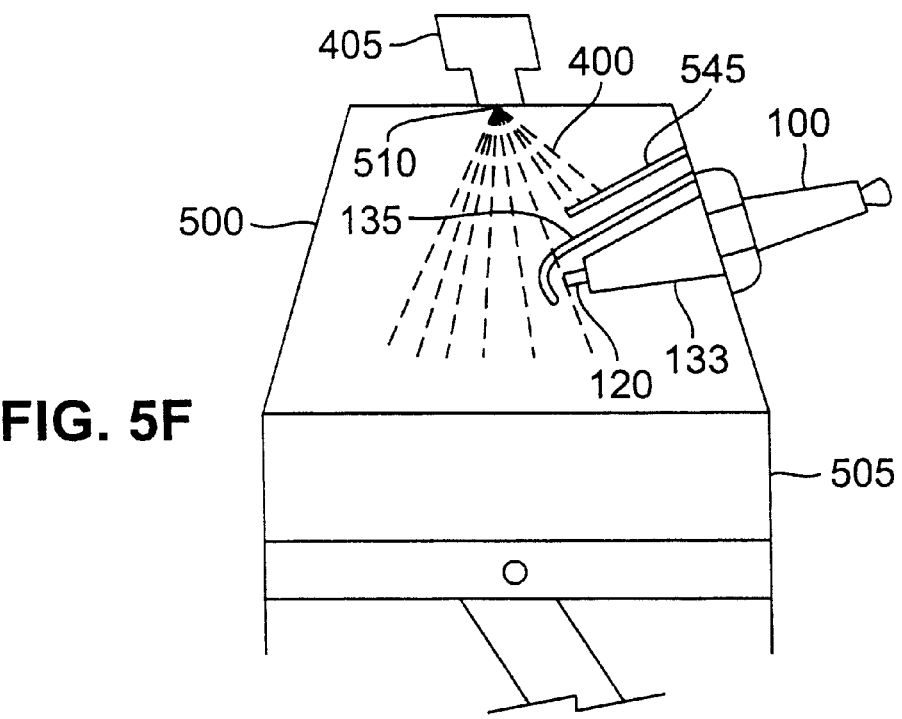
FIG. 5F is a side view of the spark plug and protective shield of FIG. 5E installed in the head of a DI engine showing non-optimal alignment of the spark plug.

FIG. 5F illustrates non-optimal positioning of spark plug 100, with ground electrode 135 obstructing the flow of spray cone 400 from intake port 510 to firing electrode 120. As described above, a round or air-foil-shaped ground electrode 135 lessens the blockage of fuel flow caused by non-optimal alignment of the ground electrode relative to the fuel intake port 510.

Figure 6A:
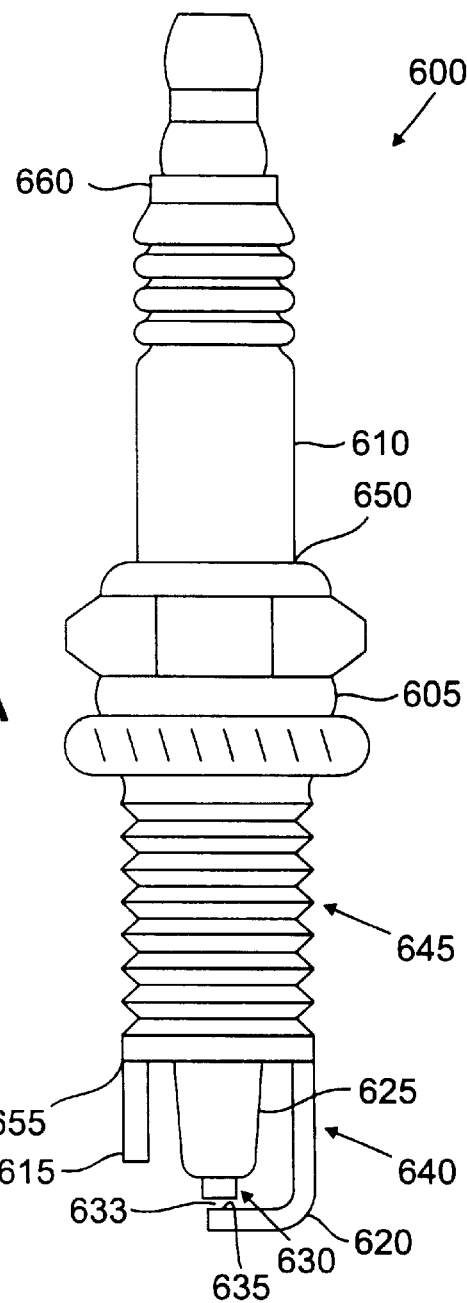
FIG. 6A is a perspective view of a spark plug having a protective shield.
Figure 6B:
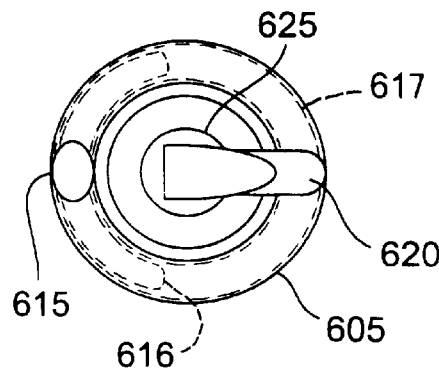
FIG. 6B is a bottom view of the spark plug of FIG. 6A.
Figure 6C:
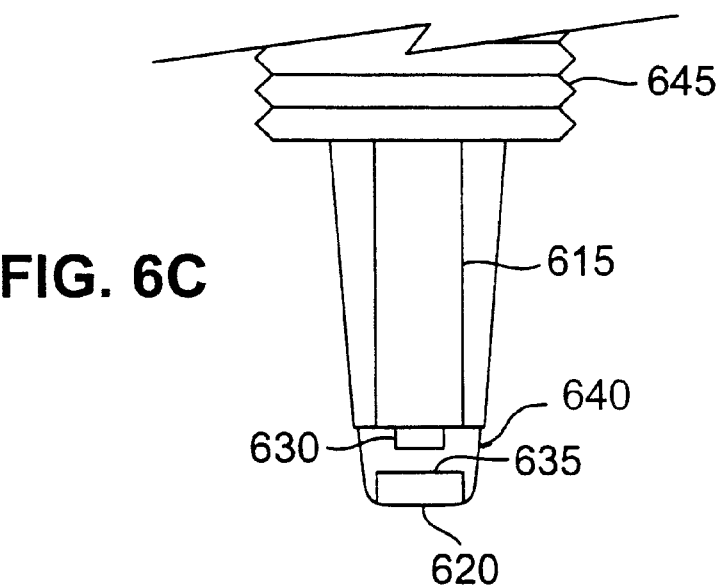
FIG. 6C is a front view of the electrodes and shield of the spark plug of FIG. 6A.

Referring to FIGS. 6A–6C, a spark plug 600 includes an outer shell 605 and an insulator core 610. Outer shell 605 includes a protective shield 615 and a ground electrode 620. Protective shield 615 may be a metal rod attached to the outer shell. The diameter of protective shield 615 may be similar to the diameter of ground electrode 620. In other embodiments such as is shown in FIG. 6B, a protective shield 616 may partially encircle the circumference of an insulator core nose 625. For example, the shield may define an arc of 180° or may be a skirt encircling the entire circumference of insulator core nose 625 as shown at 617. Shield 615 is configured to extend from outer shell 605 to a distance sufficient to prevent a spray cone of fuel from contacting insulator core nose 625 (or to reduce the amount of fuel that does so) without interfering with the flow of the vapor of the spray cone of fuel to the spark gap of the spark plug. As described above, fuel contacting the insulator core nose may result in deposits that cause fouling of the spark plug.

Ground electrode 620 extends from outer shell 605 and terminates adjacent to a firing electrode 630. A spark gap 633 is defined between firing electrode 630 and ground electrode 620. The ground electrode 620 is in the shape of an L-shaped pin. As described above, ground electrode 620 may be formed from metal rod 200 that is welded to outer shell 605 and then bent into an L-shape. A conducting end 635 of ground electrode 620 is flat to improve spark quality and a remaining length 640 of ground electrode 620 is round or has an air-foil-shaped profile. Outer shell 605 also may include a threaded length 645.

Insulator core 610 extends through a central bore 650 within outer shell 605. Insulator core 610 includes a firing end 655 and a terminal end 660 at the opposite end of spark plug 600. Firing electrode 630 extends out of insulator core nose 625, which extends out of shell 605.

Figure 7:
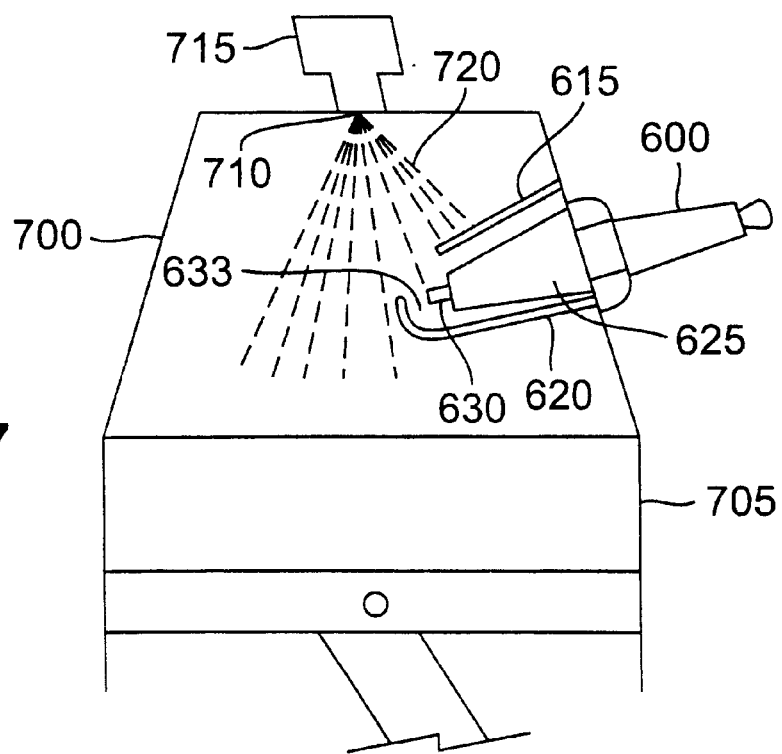
FIG. 7 is a perspective view of the spark plug of FIG. 6A installed in the head of a DI combustion engine.

Referring to FIG. 7, spark plug 600 is threadably installed in a head 700 of a combustion chamber 705 of a DI combustion engine. A fuel intake port 710 opens into head 700. An injector 715 injects a spray cone 720 of liquid fuel in the direction of firing electrode 630. Shield 615 is configured to block the liquid portion of spray cone 720 from contacting insulator core nose 625. A reduction in the quantity of liquid of spray cone 720 contacting core nose 625 reduces deposits that may cause spark plug fouling.

Other embodiments are within the scope of the following claims.

What is claimed is:

1. A direct injection combustion engine comprising:
   a combustion chamber, including a fuel intake port, an air intake port and a spark plug insertion opening;
   a spark plug including a threaded shell having a firing end, a firing electrode, a ground electrode, and an insulator core nose extending substantially beyond the firing end of the threaded shell, the spark plug being installed in the opening so that the firing electrode, the ground electrode, and the insulator core nose extend into the chamber; and
   a shield extending from the spark plug and positioned between the fuel intake port and the spark plug insertion opening and configured to reduce the flow of fuel from the fuel intake port to the insulator core nose, including the portion of the core nose extending into the chamber, without preventing flow of fuel directly from the fuel intake port to a spark gap defined between the firing electrode and the ground electrode, wherein the shield has a length that is sufficient to protect the insulator core nose but not an excessive length so as to block the flow of fuel from reaching the spark plug gap.

2. The combustion engine of claim 1, wherein the protective shield comprises a rod.

3. The combustion engine of claim 1, wherein the shield comprises one of a metal or ceramic material with thermal properties suitable for placement in the head of the combustion chamber.

4. The combustion engine of claim 3, wherein the shield is comprised of nickel or a nickel alloy.

5. The combustion engine of claim 1, wherein the ground electrode has a round shape.

6. The combustion engine of claim 1, wherein the ground electrode has a shape resembling an air foil.

7. A spark plug comprising:
   an outer shell defining a bore;

an insulator core positioned in the bore and including an insulator core nose extending substantially beyond the outer shell;

a firing electrode extending from the insulator core nose;

a ground electrode extending from the outer shell and being positioned to define a spark plug gap with the firing electrode; and a protective shield extending from the outer shell and configured to shield a portion of the insulator core nose, wherein the shield extends a length that is sufficient to protect the insulator core nose but not an excessive length so as to block a flow of fuel from reaching the spark plug gap.

8. The spark plug of claim 7, wherein the protective shield comprises a rod.

9. The spark plug of claim 7, wherein the protective shield encircles a portion of the circumference of the insulator core nose.

10. The spark plug of claim 7, wherein the protective shield encircles the entire circumference of the insulator core nose.

11. The spark plug of claim 8, wherein the flow of fuel includes a liquid portion and a vapor portion and the protective shield principally obstructs the liquid portion.

12. The spark plug of claim 8, wherein the ground electrode has a round shape.

13. The spark plug of claim 8, wherein the ground electrode has a shape resembling an air foil.

14. A method of improving engine performance, comprising:

providing a direct injection combustion engine including a combustion chamber having an air intake port, a fuel intake port and a spark plug opening;

inserting a spark plug in the spark plug opening, the spark plug including a threaded shell having a firing end, a firing electrode, a ground electrode, and an insulator core nose that extends substantially beyond the firing end of the threaded shell into the chamber; and positioning a shield extending from the spark plug between the fuel intake port and a center of the spark plug opening, the shield being configured so that the flow of fuel from the fuel intake port to the insulator core nose is reduced without preventing the direct flow of fuel to a spark plug gap defined between the firing electrode and the ground electrode, wherein the shield has a length that is sufficient to protect the insulator core nose but not an excessive length so as to block the flow of fuel from reaching the spark plug gap.

* * * * *